US012377376B2

(12) United States Patent
Varrin

(10) Patent No.: US 12,377,376 B2
(45) Date of Patent: Aug. 5, 2025

(54) METHOD AND APPARATUS FOR ENHANCED SEPARATION AND REMOVAL OF CONTAMINANTS AND IRRADIATED PARTICULATES FROM FLUIDS

(71) Applicant: VRD, LLC, Leesburg, VA (US)

(72) Inventor: Robert Varrin, Reston, VA (US)

(73) Assignee: VRD, LLC, Leesburg, VA (US)

( * ) Notice: Subject to any disclaimer, the term of this patent is extended or adjusted under 35 U.S.C. 154(b) by 883 days.

(21) Appl. No.: 17/436,144

(22) PCT Filed: Mar. 2, 2020

(86) PCT No.: PCT/US2020/020631
§ 371 (c)(1),
(2) Date: Sep. 3, 2021

(87) PCT Pub. No.: WO2020/180774
PCT Pub. Date: Sep. 10, 2020

(65) Prior Publication Data
US 2022/0143537 A1 May 12, 2022

Related U.S. Application Data

(60) Provisional application No. 62/813,101, filed on Mar. 3, 2019.

(51) Int. Cl.
*B01D 37/02* (2006.01)
*B01D 37/04* (2006.01)
(Continued)

(52) U.S. Cl.
CPC ............ *B01D 37/02* (2013.01); *B01D 37/04* (2013.01); *B01D 43/00* (2013.01); *G21F 9/06* (2013.01);
(Continued)

(58) Field of Classification Search
CPC ............ B01D 37/02; B01D 2239/0414; B01D 2239/0471; B01D 2239/0478; B01D 2239/0485; B01D 2239/0492
See application file for complete search history.

(56) References Cited

U.S. PATENT DOCUMENTS 6,396,892 B1    5/2002  Frattini et al.
7,462,283 B2   12/2008  Kelly et al.
(Continued)

FOREIGN PATENT DOCUMENTS

EP     0307144 A2   3/1989
WO     0151170 A1   7/2001
(Continued)

OTHER PUBLICATIONS

Choy, "Chemical vapour deposition of coatings." Progress in materials science 48.2 (2003): 57-170 (Year: 2003).*

(Continued)

*Primary Examiner* — Anthony J Zimmer
*Assistant Examiner* — Eric Scott Sherman
(74) *Attorney, Agent, or Firm* — FISHERBROYLES, LLP; Ronni S. Jillions

(57) ABSTRACT

A method and apparatus for separation of radioactive particulates from liquids by filtration to remove or recover the particulates, that reduces the surfaces forces associated with electrostatic attraction between the particles and the filter medium by modifying or coating the surface of the filter medium with a material that exhibits a surface charge closer to or the same as that of the particulates in a given aqueous liquid. The method and apparatus can be used to filter radioactive particulates and contaminants from aqueous liquid or liquid process streams with a radiation resistant filter medium. The filters can exhibit a surface charge different from that of the particulates targeted for separation (Continued)

by mechanical filtration. The filtration medium can be modified to increase its resistance to erosion to permit use of more powerful backwashing regeneration methods and prevent attachment of the particulates to the filtration medium by coating the medium with a hydrophobic layer.

13 Claims, 6 Drawing Sheets

(51) Int. Cl.
 B01D 43/00 (2006.01)
 G21F 9/06 (2006.01)
(52) U.S. Cl.
 CPC ............... B01D 2239/0414 (2013.01); B01D 2239/0471 (2013.01); B01D 2239/1291 (2013.01)

(56) References Cited

U.S. PATENT DOCUMENTS

| | | |
|---|---|---|
| 8,052,879 B2 | 11/2011 | Gross et al. |
| 2006/0144790 A1 | 7/2006 | Kelly et al. |
| 2013/0045150 A1 | 2/2013 | Lee et al. |

FOREIGN PATENT DOCUMENTS

| | | | | |
|---|---|---|---|---|
| WO | WO2007057215 | * | 5/2007 | ............ B01D 53/94 |
| WO | WO2013128191 | * | 9/2013 | ......... C23C 18/1662 |

OTHER PUBLICATIONS

Marek Kosmulski, "pH-dependent surface charging and points of zero charge. IV. Update and new approach", Journal of Colloid and Interface Science 337 pp. 439-448 (May 2009).
Jordan Baux et al., "Film-forming amines for corrosion protection of carbon steels in PWR secondary circuit conditions", (2019) HAL Id: hal-02415481, https://hal.archives-ouvertes.fr/hal-02415481.
W. E. Berry et al., "Survey of Corrosion Product Generation, Transport, and Deposition in Light Water Nuclear Reactors", N P-522, Technical Planning Study 76-663, Final Report, Battelle, Columbus Laboratories (1979).
Marek Kosmulski, "pH-dependent surface charging and points of zero charge. IV. Update and new approach", Journal of Colloid and Interface Science 337 (2009) 439-448.
Ullmann's Encyclopedia of Industrial Chemistry, Gosele, W. and Alt, C. "Filtration, 1. Fundamentals" (2000), Wiley-VCH Verlag Gmbh & Co.
Varrin, R., Jr. "Characterization of PWR Steam Generator Deposits" EPRI TR-106048, (Feb. 1996).
"The Simplest Self-cleaning Filter Worldwide", Advanced Filter Solution (2016).
Jinkeun Kim et al., "Characteristics of Zeta Potential Distribution in Silica Particles", Bull. Korean Chem. Soc., vol. 26, No. 7 (2005).
Tutoring including Hamaker Constants of Various Materials-Rahaman; anibal.gyte.edu.tr/hebe/abldrive/72191154/w/storage/101_2010_2_262_72191154/downloads/mem362-5b.pdf, Jun. 2012.
Malvern Instruments, "Zeta Potential An Introduction in 30 Minutes" (2005).
Pall, "Understanding Particle Filtration in Liquids in Food and Beverage Industry Applications" (2016).
Song et al., "The Experimental Result of Magnetic Filter using Permanent Magnet for Removal of Radioactive Corrosion Product" (2002).
Surface Charge, Wikipedia (2019).
Etelka Tombacz, "pH-dependent Surface Charging of Metal Oxides", Periodica Polytechnica (2009).
M. N. Rahaman, "Ceramic Processing and Sintering", Second Edition, Department of Ceramic Engineering, University of Missouri-Rolla, CRC Press, Taylor and Friends Group (2003).
Jordan Baux et al., "NadineImpedance analysis of film-forming amines for the corrosion protection of a carbon steel", (2018) Electrochimica Acta, 283. 699-707. ISSN 0013-4686.
Iva Betova et al., "Film-Forming Amines in Steam/Water Cycles—structure, properties, and influence on corrosion and deposition processes", Research Report VTT-R-03234-14 (2014).
Dale Stuart, PE Exclusive: Emergence of Film Forming Substances for Steam Generator Corrosion Protection, Jan. 3, 2019.
Written Opinion of the International Searching Authority of PCTUS2020/020631 dated Aug. 31, 2021.

* cited by examiner

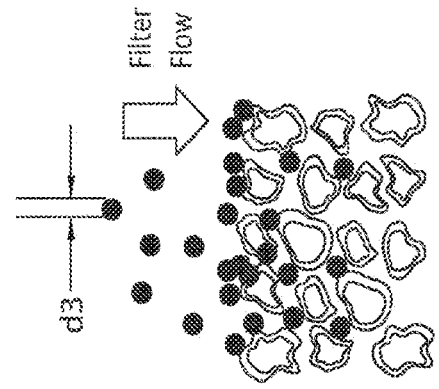
Figure 6
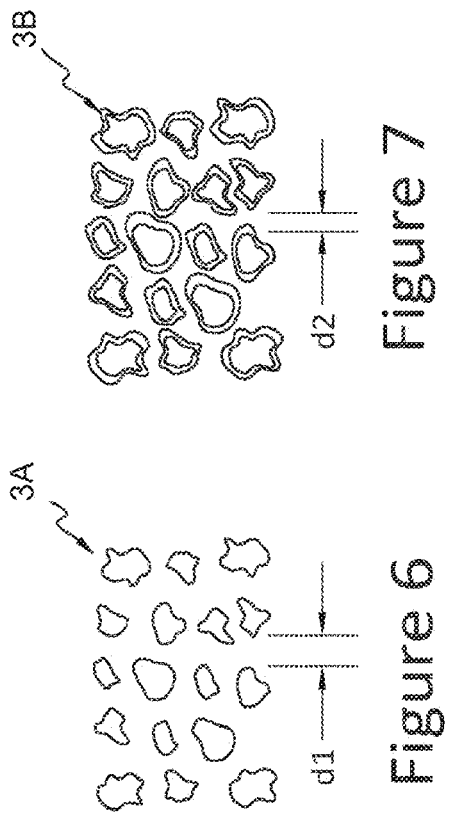
Figure 7
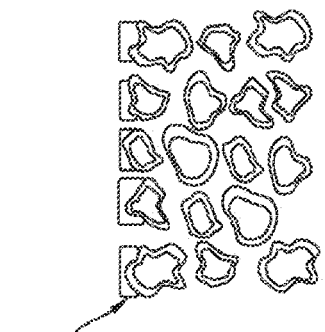
Figure 8
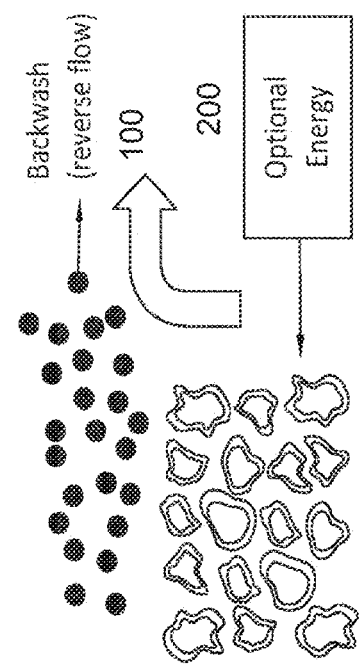
Figure 9
Figure 10

METHOD AND APPARATUS FOR ENHANCED SEPARATION AND REMOVAL OF CONTAMINANTS AND IRRADIATED PARTICULATES FROM FLUIDS

BACKGROUND

Various embodiments relate to the cleaning, treatment or purification of aqueous fluids at nuclear facilities. Embodiments also include concentration and collection of solid particulates from aqueous liquids at nuclear facilities.

It is commonplace to separate and remove particulate materials found in aqueous liquids and solutions at industrial facilities such as electricity generating power plants including fossil power plants, geothermal power plants, or nuclear power plants. Other nuclear facilities not used for generation of electricity also have needs for separation of particulates from fluids as part of normal operations or waste treatment operations. Overall, separation of particulates is required to achieve a targeted fluid purity or clarity, to reduce the radioactive activity of the fluid/particulate mixture, to collect the particulates (e.g., for disposal or further treatment), or to permit re-use or additional treatment of the fluid. Particulates may also need to be removed to prevent damage to equipment through which the fluids pass. It is often necessary or desirable to remove materials found in aqueous solutions to permit disposal of such fluids at non-nuclear industrial facilities Particulates in electricity producing nuclear power plant aqueous fluids to be removed or separated include but are not limited to particles in make-up water supplies and tanks, condensate storage tanks, spent fuel pools, and reactor cavities. Particulate compositions include metal oxides, silica species, detritus (e.g. waste, debris, dirt, dust), and "foreign objects" (e.g. grinding medium, residuals from mechanical or thermal or plasma cutting and machining operations) or wear generated particles from equipment. Particulates also include corrosion products, such as metallic oxide, that may result from corrosion or erosion of plant equipment or fuel. These particulates exhibit a range of compositions and sizes that range from submicron to 100 micron or larger.

Particulates in other nuclear facility aqueous fluids to be removed or separated include but are not limited to particles in wastes generated during the production of nuclear materials for nuclear weapons or during reprocessing or recycling of spent nuclear fuel for reuse as nuclear fuel.

SUMMARY

A method and apparatus are provided for improved separation of particulates from liquids by filtration for the purpose of removal or recovery of the particulates. Benefits of the disclosed subject matter include higher filtration process efficiency and improved, more effective, timely or enhanced regeneration or cleaning of the filter medium, for instance by rinsing, backwashing, ultrasonic cleaning, back pulsing or back pressure pulsing. The disclosed subject matter may also result in higher capacity or loading of the filter medium, and decreased energy requirements for filtration.

The improvements are achieved by reducing the surface forces associated with electrostatic attraction between the particles and the filter medium by modifying or coating the surface of the filter medium with one or more materials that exhibit a surface charge closer to, or the same as, that of the particulates in a given aqueous liquid. This permits filtration by mechanical interception but reduces one or more forces that result in adhesion. Such adhesion forces can prevent or hinder regeneration or cleaning of the filter if these forces are greater than the forces imparted by the cleaning or regeneration method. The disclosed subject matter is particularly useful in the filtration of radioactive particulates and contaminants from aqueous liquid inventories or liquid process streams owing to the high cost of filtration equipment and filters used for radioactive fluid treatment. Filtering liquids that contain radioactive constituents may require the use of radiation resistant filter media (also referred to in the singular as medium herein), such as ceramics, sintered metal powders, or sintered metal fibers. These types of filter media can exhibit a surface charge very different from that of the particulates targeted for separation by mechanical filtration. The electrostatic attraction of the radioactive particles due to disparity in surface charge of the particles relative to the filter medium can increase tendency for fouling and hinder regeneration or cleaning of the medium. Liquids containing radioactive species and particulates that are candidates for improved filtration include liquids at commercial nuclear power plants, liquid wastes generated during cleaning or decommissioning of nuclear power plants, liquids at plants that have experienced radiological events or accidents, and liquid wastes stored (for example, in underground tanks) and treated at nuclear reactor sites operated for non-electric power production purposes including nuclear weapons production.

According to one embodiment, the method comprises identifying a volume of liquid or a liquid process stream from which particulate species need to be separated, characterizing the particulate species with respect to their physical dimensions and chemical composition, measuring or alternatively assessing the surface charge of these particulate species based on their chemical composition and fluid properties of the liquid containing them, selecting one or more processes for modifying a filtration medium or media to reduce the adhesion of the particle species to the filtration medium but still retain the particle species targeted for separation from the fluid, applying one or more of these modification processes to the filtration medium or media, treating the liquid containing the particulate species to separate the particulate species from the liquid using the modified filtration medium or media, and optionally regenerating the filtration medium or media to remove the particulate species to re-use the filtration medium or media and/or collect the particulate species.

According to an embodiment of the method, the particulate species are organic or inorganic.

According to an embodiment of the method, the particulate species are selected from metal oxides, silica species, detritus, grinding medium, residuals from cutting and machining operations, wear generated particles from equipment, corrosion products that result from corrosion or erosion of plant equipment or fuel, or inorganic ion exchange medium that selectively remove radioactive species.

According to an embodiment of the method, the corrosion products in pressurized water reactor (PWR) and boiling water reactor (BWR) liquid process streams are CANDU Reactor Unidentified Deposit (CRUD) that are formed on the primary nuclear side of the plants as well as corrosion products on the secondary or non-radioactive side of PWRs.

According to an embodiment of the method, the particulate species are radioactive and non-radioactive metals, oxides or solids present in wastes or byproducts generated during production of fissile materials for nuclear weapons.

According to an embodiment of the method, the isoelectric point (IEP), point of zero charge (PZC), or zeta potential is estimated or measured for the particulate species in the process stream liquids and the filter medium as a function of pH and temperature to assess their surface charge.

According to an embodiment of the method, the process for modifying the filtration medium is selected from one or more of coating, converting or treating the filtration medium surfaces so as to produce one or more layers on the wetted surfaces of the filtration medium material which change the IEP, PZC and/or zeta potential of the surface of the medium, or which changes the magnetic properties of the filtration medium at the surface.

According to an embodiment of the method, the filtration medium is selected to capture the particulate species of interest by mechanical interception or adhesion.

According to an embodiment of the method the initial filtration medium may have a pore size, pore size distribution, specific surface area (SSA), or tortuosity different from the final modified filtration medium that does not negatively impact the ability to regenerate the filtration medium or media when more than one medium is used.

According to an embodiment of the method, the filtration medium or media that may be coated is selected from metal or organic fibers, metal, organic or ceramic porous medium, or deep bed filters comprising particles, sand, or granules.

According to an embodiment of the method, the filtration medium or media is/are selected to be tolerant of the fluid chemistry and other environmental parameters of temperature, pressure, or radiation field.

According to an embodiment of the method, the coating on the filtration medium is selected to be tolerant of the fluid chemistry and other environmental parameters of temperature, pressure, or radiation field.

According to an embodiment of the method, the coating or treating process is accomplished by means of chemical reaction, oxidation, passivation, electropolishing, etching, descaling, pickling, physical vapor deposition (PVD), or chemical vapor deposition (CVD).

According to an embodiment of the method the coating is accomplished by line of sight processes of sputtering or PVD, or homogenous processes of chemical treatment, CVD, electroplating or electroless deposition.

According to an embodiment of the method, the coatings are inorganic and selected from carbides, amorphous silica, crystalline silicon species, ZrC, SiC, nitrides, carbides, metals, diamond-like-coatings (DLC), and ferrites.

According to an embodiment of the method, when the coatings are nitrides, selected from titanium nitride and related compounds, the hardness and hence erosion and/or corrosion resistance of the media is improved.

According to an embodiment of the method, the coatings are organics selected from film forming amines, film forming products and fluorinated hydrocarbons.

According to an embodiment of the method, reducing the van der Waals attractive forces between the particulate species and the filtration medium is the criterion for selecting the filtration medium or the modification to the medium based on measured oft-cited Hamaker constants.

According to an embodiment of the method, when the coating process is CVD, the coating thickness is in the range of from about ≤100 angstrom to 3000 angstrom or more.

According to an embodiment of the method, the coating thickness is about 500 angstroms.

According to an embodiment of the method, when the coating process is electroless metals deposition, the coating is less than 1 micron.

According to an embodiment of the method, when the coating is an oxidation process that modifies the surface, the thickness of the modified layer is from about <0.03 to about >3 microns.

According to an embodiment of the method, when surface treatment of the medium is with a surfactant, film forming amine or film forming agent, the thickness of the coating is less than 100 nm but may be less than 10 nm.

According to an embodiment of the method, more than one type of surface modification can be employed in combination with the filtration medium.

According to an embodiment of the method, pore surfaces internal to the filtration medium can be coated with a homogenous process with one material and one process, and a second coating material coated on exposed surfaces of the filtration medium using a line of site process.

According to an embodiment of the method, the filtration medium or media is/are regenerated.

According to one embodiment of the method, more than one form of modified or treated filtration medium can be used together, in series or in parallel with one another, or a treated medium used in combination with an untreated medium or media.

According to an embodiment of the method, the process for regenerating the filter medium is backwashing of the filter by reverse flow, forward flow, pressure pulsing, acoustic pulsing or ultrasonic cleaning.

According to an embodiment of the method, the coating, modifying or altering the surface properties of the filtration medium is extended to wetted surfaces of other parts of the filtration system to prevent adhesion of particulates to filter housings, fluid conduits and pumps.

According to one embodiment, an apparatus includes a source of fluid, a filter housing and filtration medium or media, together forming a filter, wherein the filtration medium has surface characteristics that reduce or eliminate the irreversible attachment of particulate species to the filter, optionally a device for flowing or pumping the fluid through the filter, optionally a fluid conduit which connects the fluid flowing or pumping device to the filter, the fluid conduit being fitted with an optional isolation or flow limiting device, a path for fluid through the filter in reverse direction, with an isolation or flow control device to be used for backwashing alignment, a path for filtered fluid to exit as permeate/effluent optionally through a conduit and control device, a backwashing regeneration system configured to provide reverse flow fluid exits via optional conduit equipped optionally with a flow control device which is closed nursing normal filtration operations, which optionally includes a device for introducing energy from pressure pulsing, back pulsing or ultrasonic energy to the filter apparatus, and optionally a suction pump that promotes flow through the filter, wherein each of the conduits, flowing or pumping devices, flow control devices, and the filter housing comprises wetted surfaces that are exposed to the fluid and particulates, and unwetted surfaces not exposed to the fluid or particulates.

According to an embodiment of the apparatus, the filtration medium is selected from metal or organic fibers, metal, organic or ceramic porous media, or deep bed filters comprising particles, sand, or granules.

According to an embodiment of the apparatus, the filtration medium is selected to be tolerant of the fluid chemistry and other environmental parameters of temperature, pressure, or radiation field.

According to an embodiment of the apparatus, the filtration medium is coated or treated to obtain the surface characteristics that reduce or eliminate the irreversible attachment of particulate species to the filter.

According to an embodiment of the apparatus, the filtration medium is modified by a process selected from one or more of coating, converting or treating the filtration medium surfaces so as to produce one or more layers on the wetted surfaces of the filtration medium material which change the IEP, PZC and/or zeta potential of the surface of the medium, or which changes the magnetic properties of the filtration media at the surface.

According to an embodiment of the apparatus, the coating on filtration medium or other parts of the apparatus, or converted or treated surfaces of the medium or other parts of the apparatus is selected to be tolerant of the fluid chemistry and other environmental parameters of temperature, pressure, or radiation field.

According to an embodiment of the apparatus, the filtration medium is selected to capture the particulate species of interest by mechanical interception or adhesion.

According to an embodiment of the apparatus, the initial filtration medium may have a pore size, pore size distribution, specific surface area (SSA), or tortuosity different from the final modified filtration medium that does not negatively impact the ability to regenerate the filtration medium.

According to an embodiment of the apparatus, the filtration medium that may be coated is selected from metal or organic fibers, metal, organic or ceramic porous media, or deep bed filters comprising particles, sand, or granules.

According to an embodiment of the apparatus, the filtration medium is selected to be tolerant of the fluid chemistry and other environmental parameters of temperature, pressure, or radiation field.

According to an embodiment of the apparatus, the coating or treating process is accomplished by means of chemical reaction, oxidation, passivation, electropolishing, etching, descaling, pickling, physical vapor deposition (PVD), or chemical vapor deposition (CVD).

According to an embodiment of the apparatus, the coating is accomplished by line of sight processes of sputtering or PVD, or homogenous processes of chemical treatment, CVD, electroplating or electroless deposition.

According to an embodiment of the apparatus, the coatings are inorganic and selected from carbides, amorphous silica, crystalline silicon species, ZrC, SiC, nitrides, carbides, metals, diamond-like-coatings (DLC), and ferrites.

According to an embodiment of the apparatus, when the coatings are nitrides, selected from titanium nitride and related compounds, the hardness and hence erosion and/or corrosion resistance of the media is improved.

According to an embodiment of the apparatus, the coatings are organics selected from film forming amines, film forming agents, and fluorinated hydrocarbons.

According to an embodiment of the apparatus, reducing the van der Waals attractive forces between the particulate species and the filtration medium is the criterion for selecting the filtration medium or the modification to the medium based on measured or cited Hamaker constants.

According to an embodiment of the apparatus, when the coating process is CVD, the coating thickness is in the range of from about ≤100 angstrom to 3000 angstrom or more.

According to an embodiment of the apparatus, the coating thickness is about 500 angstroms.

According to an embodiment of the apparatus, when the coating process is electroless metals deposition, the coating is less than 1 micron.

According to an embodiment of the apparatus, when the coating is an oxidation process that modifies the surface, the thickness of the modified layer is from about <0.03 to about >3 microns.

According to an embodiment of the apparatus, more than one type of surface modification can be employed in combination with the filtration medium.

According to an embodiment of the apparatus, more than one filter medium can be used wherein According to an embodiment of the apparatus the coating, modifying or altering the surface properties of the filtration medium are extended to other parts of the filtration system such as filter housings, fluid conduits and pumps.

According to an embodiment of the apparatus, the system for regenerating the filtration system backwashes the filter by reverse flow, forward flow, pressure pulsing, acoustic pulsing or ultrasonic cleaning.

According to an embodiment of the apparatus, the coating, modifying or altering the surface properties of the filtration medium is extended to wetted surfaces of other parts of the filtration system to prevent adhesion of particulates to filter housings, fluid conduits and pumps.

According to one embodiment, the apparatus comprises a filtration system or filter incorporating a filtration medium with surface characteristics that reduces or eliminates the irreversible attachment of particulate species to the filter, and a system for regeneration of the filtration system.

According to an embodiment of the apparatus, the filtration system comprises a filter comprising a filter housing and a filter media disposed within the filter housing.

According to an embodiment of the apparatus more than one filter media may be disposed in a filter housing.

According to an embodiment of the apparatus, the filtration system comprises an input source for a fluid to be filtered optionally provided with a device that pumps or causes the fluid to flow through the filter.

According to an embodiment of the apparatus, a conduit may be provided which connects the fluid input source to the filter with an optional isolation or flow limiting device to regulate flow to the filter.

According to an embodiment of the apparatus more than one filter housing containing one or more filter media may be provided in series or in parallel.

According to an embodiment of the apparatus, filtered fluid exits the filter as a permeate/effluent through a conduit and optionally an isolation or flow limiting device.

According to an embodiment of the apparatus, a suction pump may be connected to the filtered fluid exit with or without the flow or pumping device to promote flow through the filter.

According to an embodiment of the apparatus, the system for regeneration involves backwashing and comprises an optional conduit for backwashing fluid to exit the filter optionally fitted with a valve which is closed during normal filtration operations. According to an embodiment of the apparatus, the filter is connected to a pumping or fluid flowing device for backwashing of the fluid which optionally comprises a device for introducing energy to the filter by pressure pulsing, back pulsing or ultrasonic energy.

According to an embodiment of the apparatus, with the various components or parts used to construct the apparatus there are both wetted surfaces that are exposed to the fluid and particulates and unwetted surfaces that not exposed to the fluid or particulates, and wherein the wetted surfaces have surface characteristics that reduce or eliminate the irreversible attachment of particulate species.

BRIEF DESCRIPTION OF THE DRAWINGS

The invention is explained in greater detail below with reference to drawings that illustrate multiple implementation approaches. In this regard, further features and advantages of the invention that are essential to the invention emerge from the drawings and their description.

FIG. 6 shows one example embodiment of a porous filter media.

FIG. 7 shows a representation of a filter media filter medium after homogeneous surface treatment.

FIG. 8 shows particulates being entrapped in the filter medium during flow according to one embodiment.

FIG. 9 shows particles being dislodged and removed by backwashing.

FIG. 10 shows one embodiment of a homogeneous treatment covering internal pore structures and a second treatment only on the outer surface.

DETAILED DESCRIPTION

Figure 1A:
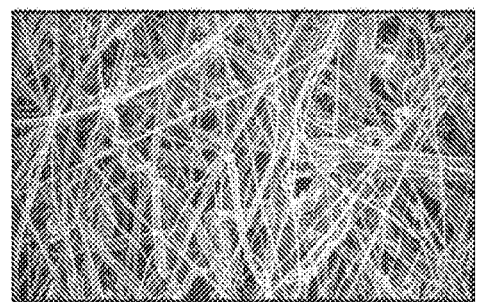
FIGS. 1A and 1B show SEM images of fibrous and sintered metal filtration medium.

In the context of one embodiment of the disclosed subject matter, filtration includes the processes of: (1) transferring, passing or pumping fluid through a porous medium, wherein the medium may be in the form of a cartridge filter, cake filter, depth filter, dead end filter (e.g., candle filter) or through a cross flow filter, to separate, sequester or retain particulates; (2) removal/replacement of the filter medium/ element after the process is complete or the filter loading capacity has been met; and (3) optionally employing a means or method for periodic regeneration of the filter. Filtration can also be achieved by the pressure gradient achieved by gravity or in centrifuges. The pore size, pore size distribution, thickness, and other aspects of the filter medium such as structural integrity or chemical or environmental (temperature, pressure, radiation field) compatibility with the fluid stream, are chosen to reliably sequester, hold, and retain particulates. Filtration may be ceased if the need for filtration disappears (fluid is clean), other filtration goals have been met (solids concentration goals achieved for example in dynamic cross flow filtration), or the filtration process is terminated due to excessive filter loading, excessive radioactivity level on the filter (in the case of filtering radioactive particles), or there is reduced filtration throughput, efficiency or excessive pumping power required due to fouling.

Typically, the filter medium used depends on the user's specific goals and objectives. Filter medium can include natural material (cellulose or cotton), polymers (urethanes, nylons, plastics, and olefins), ceramics, or metals and metal alloys. Magnets may also be used for filtration if the particulates exhibit enough magnetic susceptibility inherently or through magnetic seeding.

Retention of particulates on the medium can be by mechanical interception (usually for particles sizes of 1 to more than 100 micron), adhesion by electrostatic or van der Waals forces (typically for particles about 1 micron in size), or by surface forces including electrostatic charge or surface active site (relevant for particles less than 0.1 micron to about 1 micron—see Ullmann's, 2000).

Filtration may also be used to remove soluble species and contaminants if the filtration medium is configured to do so and contains in total or in part a medium that absorbs or otherwise sequesters the soluble species and contaminants. Medium amenable to sequestration or removal of soluble species includes organic ion exchange resins, inorganic ion exchange medium or electrochemical devices.

The physical and chemical mechanisms involved in filtration are well documented in the literature and not repeated here (see for example, Ullmann's, 2000).

An apparatus and method for an enhanced separation of particulates by filtration are provided (also referred to herein as fluid treatment). Example particulates at nuclear facilities, the mechanism of filtration, means of optimizing filtration through regeneration of the medium, and a description of the various features of the apparatus and method are described below.

Particulates—While there are many aqueous fluids in nuclear facilities that contain particulates and many particulate types, five are noted herein as examples.

A. CRUD—Corrosion products in pressurized water reactor (PWR) and boiling water reactor (BWR) fluid medium include CRUD (CANDU Reactor Unidentified Deposit) formed in primary (nuclear side) of the plants as well as corrosion products on the secondary or non-radioactive side of PWRs. CRUD may contain metallic species (iron, nickel or cobalt particles), corrosion products or oxides of metals such as iron, nickel chromium, or cobalt. Particles sizes as characterized by mean diameter can be from <0.1 micron to 100 micron or more. When present on the primary side of the power plant, they may become radioactive or activated during plant operations. Their radioactivity is in many cases so high that exposure to CRUD or removal from primary coolant, or other aqueous systems at plants, is hazardous. Accumulation of CRUD on fuel surfaces of some plant equipment is also undesirable. In the case of CRUD on fuel, it can lead to "under deposit corrosion" of the fuel or a phenomenon known as CRUD induced power shift (CIPS). This CRUD can be removed from fuel surfaces (see, for example, Frattini '892), but disposal of CRUD on filtration or other medium from which CRUD has been collected is expensive and can result in undesirable exposure of personnel to radiation and high disposal costs.

B. Silicates and other Silicon Species—Other contaminants present in nuclear plant water include silica species. These may be naturally present in make-up water supplies (all fossil and nuclear plants must have a source of "make-up" water to replace water lost due to evaporation, plant operations or sampling), or from specific sources such as degradation of fuel storage racks that contains contain silicon compounds in neutron absorbing medium. This degradation, a combination of reaction of the silicon compounds with water and exposure to radiation fields also releases boron carbide particulates. Suspension of these silica species in spent fuel pool water can lead to severe turbidity problems. Hence their removal is desirable (see for example Lambert, 2004). Silica particle sizes can range from <0.1 micron to >100 micron, with typical colloidal particles in the range of 0.1 to 1 micron. Particulates resulting from degradation of spent fuel pool storage racks may be amorphous or crystalline.

C. Particulates Associated with Waste Treatment at Nuclear Material Production Facilities—The treatment of wastes generated at non-power producing facilities during the production of fissile materials for nuclear fuel or nuclear weapons, particularly wastes at government owned and operated sites, is challenging owing to the presence of residual fissile materials and transuranic species and the physical and chemical properties of the waste including high particulate content and high pH. The filtration and collection of particulate waste species including aluminum species like gibbsite or boehmite and other oxides is often desirable to facilitate treatment of the particulate laden fluid or separation of the particulates from the fluids to facilitate treatment of the particulates themselves.

D. Inorganic Ion Exchange Medium—Other species that need to be filtered from waste processing stream include inorganic ion exchange medium such as crystalline silico-titanates (CST) that selectively remove radioactive species such as Cesium-137 among others. Removal of CSTs from fluid stream is required to contain the adsorbed radionuclides. Powdered inorganic ion exchange medium may exhibit particles sizes of <1 micron or may be granular.

E. Cutting, Grinding or Machining Debris and Particulates—The maintenance, repair or decommissioning of nuclear facilities often includes underwater cutting, grinding or machining operations. These processes produce particulates or kerf that can result in the spread of radioactive contamination within a fluid or above the surface of an aqueous fluid reservoir. These materials also can reduce water clarity which may hinder the cutting, grinding or machining operation. The removal of such particulates by filtration is often necessary.

F. Liquid Wastes at Plants that Experience Accidents—The collection and storage of liquids wastes at nuclear sites and plants that have experienced radiological or other accidents is critical to the remediation of the plant site and to protect workers and the public. The treatment of such wastes often include filtration to remove radioactive or non-radioactive particulate species to isolate them for processing or permit downstream processing or release of the fluids after removal of the particulates.

The pH of the fluids in which the particulates may exist can also vary greatly. For example, a spent fuel pool water at a boing water reactor (BWR) is generally slightly acidic or neutral (5.8 to 7), the slight acidity being due to absorption of carbon dioxide from the atmosphere forming carbonic acid. The pH of spent fuel pool water of a pressurized water reactor (PWR) is acidic (pH of 4.5 to 6) owing to the fact that it contains ~0.2M boric acid for reactivity control. The pH of liquid wastes at non-power producing nuclear facilities can be very high (pH >11 and even up to 14) as caustics are often added to waste streams to mitigate corrosion of carbon steel tanks in which the waste is stored. The temperature of the fluid can also range from above the freezing point (32° F. or less depending on the specific pressure and chemical composition of the fluid) to the boiling point of the fluid (nominally 212° F. at 1 atmosphere pressure for pure water, but it can be higher or lower depending on the fluid chemistry or ambient pressure). One skilled in that art would understand that the pH of the fluid is a function of the fluid temperature.

Volumes of fluids targeted for filtration can also range from hundreds of gallons to millions of gallons. More specifically, a single drum of particle laden fluid would represent about 55 gallons. A spent fuel pool at a nuclear facility typically has a volume of up to 500,000 gallons. On the other hand, tens of millions of gallons of contaminated waste fluids containing particulates exist at some government-owned sites in the United States and at sites that have experienced radiological accidents. The target duration of the filtration process can also vary widely, from minutes to years. The requisite flowrates through a filtration system can thus vary widely, typically from less than 1 to several thousand gallons per minute or more.

Hence, one skilled in the art would recognize that there is a wide range of particulate material in nuclear water systems in terms of chemical composition, size, physical properties, and a wide range of aqueous fluid properties, and environmental conditions, and therefore a wide range of filtration challenges. There is also a wide range of needs regarding volumes of fluids to be treated and the rates of treatment required.

Mechanism of Filtration—Mechanisms for capture or adsorption of particles in aqueous fluids on to surfaces in general include but are not limited to: (1) inertial processes such as convective transport wherein subsequent particle-surface attachment is by van der Waals forces, (2) electrostatic attraction owing to differences in the charge of the particle and the surfaces, and (3) temperature driven deposition (thermophoresis). Mechanisms for the capture of particles on or within filters include: (1) transport to the filter in the aqueous fluid with a fluid velocity or other mechanical means of fluidization (mixing, sparging) sufficient to entrain the particulates (overcome other forces such as gravity or attachment to other surfaces), (2) flow through the medium typically by a pressure differential (e.g., by pumping, pulling vacuum, or by gravity), (3) physical entrapment/mechanical interception when the filter medium pore size is less than the particle size, (4) physical entrapment by a partially consumed (occluded or fouled) filter such that the filter effective pore size becomes less that than the original nominal filter pore size during particle interception (e.g., a form of pre-coating), and (5) adsorption and adhesion due to electrostatic attraction. Flow through the filter medium and hence rate of filtration will also depend on many fluid properties such as temperature, viscosity, and surface tension. Typically, the filter is designed to achieve a target filtration efficiency for a given particle size, typically in the range of 80-100%, but most typically 90-99%.

Modeling of filtration can be used to predict filtration and filter cake formation based on particle shape and size, as well as structure, porosity and thickness of the media, or alternatively the overlying filter cake as it forms. These models consider particle sticking angle, friction, and adhesion including electrostatic attraction.

Figure 1B:
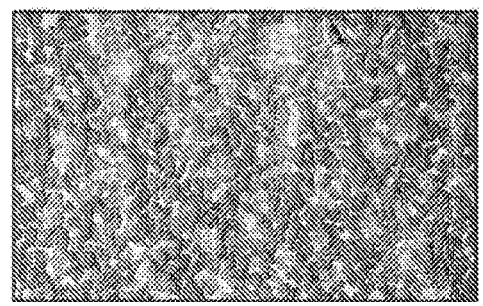

FIGS. 1A and 1B show two examples of filter medium—porous fiber and sintered metal (from Pall Corporation).

In the case of small particles on the order of 10 micron or less nominal diameter, adsorption and subsequent electrostatic attraction can be strong (see, Tombacz, 2009). For particles less than 2 micron in nominal diameter (1 micron in radius), electrostatic forces on charged particulates may exceed gravitational or inertial forces (see for example page 8-6 of Berry et al., 1976). FIG. 6 shows one example embodiment where a porous filter media 3A is selected with a nominal pore size d1 is sufficient to retain target particles.

Regarding electrostatic attraction, it is well known to those skilled in the art that particles and other solids in contact with aqueous fluids (including the filter medium) exhibit a surface charges due to adsorption or desorption of ions from water (hydration or dehydration). Surfaces exhibit sites with both negative and positive charge. If more sites are negative (adsorbed hydroxyl or $OH^-$), the net charge will be negative. If more sites are positive (adsorbed hydronium ions or $H_3O^+$), the net charge will be positive. Hydration or dehydration of the surface (see Varrin, 1996 or Berry et al., 1979) is pH dependent since the surface adsorption depends on the $OH-$ and $H_3O^+$ concentrations in the bulk fluid (hence the pH).

If the number of negatively charged and positively charge sites is equivalent, the surface will have no net charge. This is known as the isoelectric point (IEP). The pH at which this occurs is known as the point of zero charge or PZC. The net charge on a particle or surface is known as the zeta potential ($\zeta$). The relationship between the between the PZC and pH and zeta potential is as follows: $\zeta = K \cdot (PZC-pH)$, where the constant K may typically range from 1 to 100 mV depending on the fluid properties including temperature, ion concentrations and conductivity, but can be less than 1 mV or greater than 100 mV.

Example PZC values (in pH units) for species in aqueous fluids at nuclear power plants are shown in Table 1 (adopted from Berry et al., 1976, Kim et al., 2005).

TABLE 1

PZC Values of Oxides and Hydroxides in Water Cooled Nuclear Power Plants

| Metal, Cermaic, Oxide or Hydroxide | PZC (25 degrees C.) |
|---|---|
| $SiO_2$ (silicates) | 2.0 |
| SiC | 2.0 to 3.0 |
| Titanium | 4.6 |
| $Fe_2O_3$ | 5.8 to 8.6 |
| $Fe_3O_4$ | 6.5 |
| $Cr_2O_3$ | 7.0 |
| Stainless steel | 8.5 |
| $Co(OH)_2$ | 9.4 |
| NiO | 10.3 |
| $Ni(OH)_2$ | 11.1 |
| $Co(OH)_2$ | 11.4 |
| $Fe(OH)_2$ | 12.0 |

Kosmulski (2009) contains an extensive summary of PZCs for inorganic materials including many species likely to be found in nuclear facilities. The range of PZC is from about 1 to >12.5.

Example zeta potentials at three pH values are shown in Table 2 (assuming K=30 mV for illustrative purposes).

TABLE 2

Example Calculation of Zeta Potential in Aqueous Medium

| Oxide/Hrdroxide Species or Filter Media | $\zeta$ Potential (mV) (based on Z = 30 mV, pH of 4.5) | $\zeta$ Potential (mV) (based on Z = 30 mV, pH of 7) | $\zeta$ Potential (mV) (based on Z = 30 mV, pH of 11) |
|---|---|---|---|
| ZrC | −75 | −150 | −270 |
| $SiO_2$ (silicates) | −75 | −150 | −270 |
| SiC | −60 | −135 | −255 |
| $Al_2O_3$ | 0 | −75 | −195 |
| Titanium | 3 | −72 | −192 |
| Kalolinite clay | 6 | −69 | −189 |
| $Fe_2O_3$ | 60 | −15 | −135 |
| $Fe_3O_4$ | 60 | −15 | −135 |
| $ZrO_2$ | 69 | −6 | −126 |
| $Cr_2O_3$ | 75 | 0 | −120 |
| Stainless steel | 120 | 45 | −75 |
| $Co(OH)_2$ | 147 | 72 | −48 |
| NiO | 174 | 99 | −21 |
| $Ni(OH)_2$ | 198 | 123 | 3 |
| $Co(OH)_2$ | 207 | 132 | 12 |
| $Fe(OH)_2$ | 225 | 150 | 30 |

In the study of particulate/colloidal chemistry and fluids, particulates or colloids with zeta potentials greater than +30 mV or more negative than -30 mV are generally considered to be stable as dispersions and do not coalesce (see, for example, Malvern Technical Note). [Note, other references cite a range of −120 to +120 mV as being required for stable suspensions or dispersions, see for example, Ullmann, 2000]. High or low potential imparts enough repulsive forces between the particles to prevent agglomeration. Note that at pH 4.5 (typical of PWR spent fuel pool water in this illustration), alumina, titanium and kaolinite clay may tend to coalesce. At pH 7 (typical of BWR spent fuel or cavity pool water), iron oxide may have a tendency to coalesce. At pH 11, the hydroxide may not disperse as stable suspensions.

Figure 2:
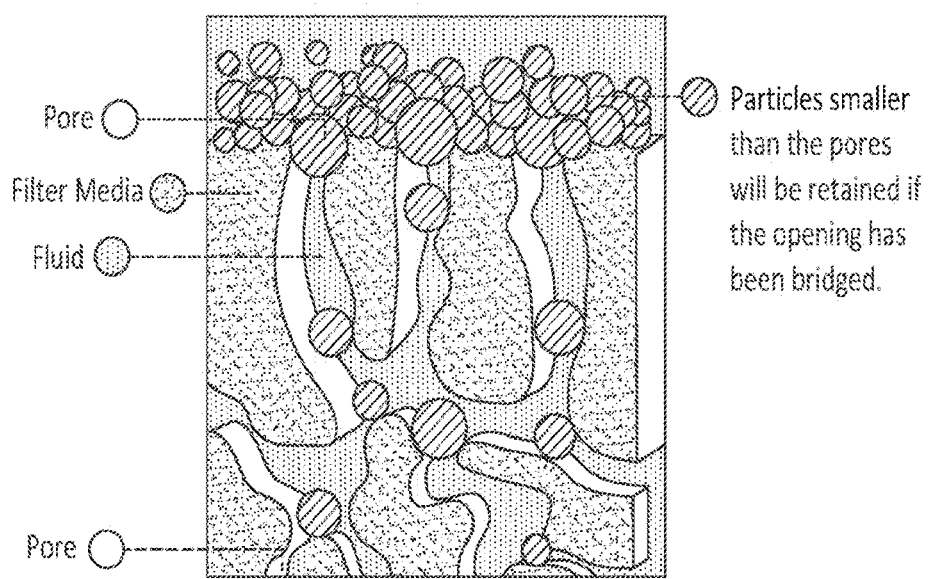
FIG. 2 shows capture of particles at filter surface and within the pores.
Figure 3:
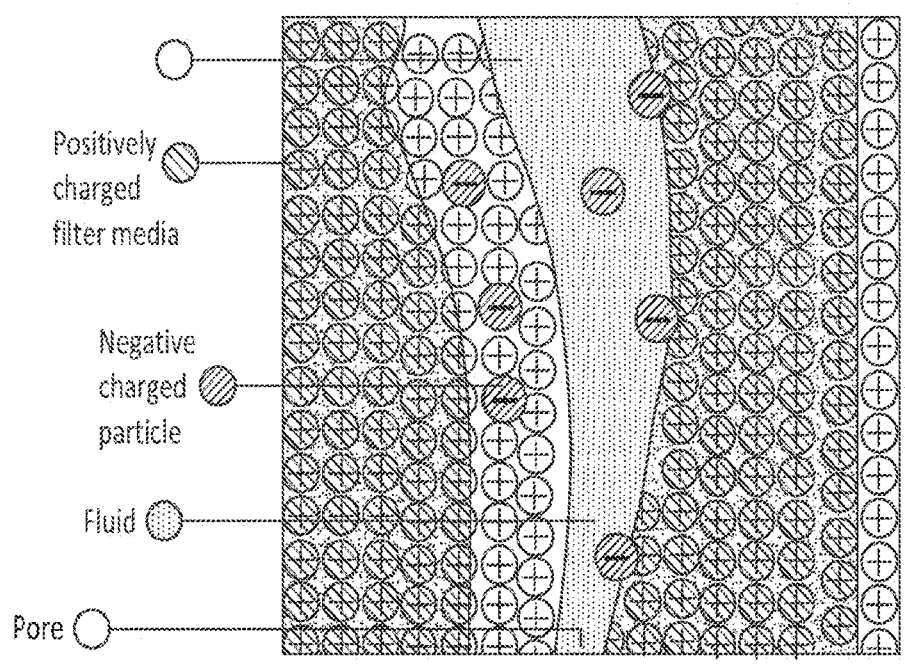
FIG. 3 shows capture of particles within pores due to potential differences.

The zeta potential of the particles and filtration medium surfaces affect filtration in two ways: (1) by attracting particles and holding them together at the surface of the filler in the filter cake or at the mouth of pores (the latter of which potentially compromises the advantages of filtering through the depth of the media), and (2) by attracting particles within the filter on surfaces, particularly deep with pores. These processes are illustrated in FIGS. 2 and 3 [reproduced from Pall Corporation].

At a given pH, electrostatic adhesion of the particle on the surface of the filter medium can be strong if the difference in PZC and hence surface charge of the particulates and filter medium are different for a given pH. As example from Table 1, the potential difference between silicates ($SiO_2$) and stainless steel is almost 200 m V. The adhesion of the particles to the medium may also be a function of the microscopic specific surface area (SSA) of the medium or roughness in addition to the nominal pore size.

The adhesion forces between the particulates and medium due to van der Walls forces can also be characterized by the Hamaker constant of the materials (see, Rahaman, 2003).

Gravity may also capture particles in the absence of flow or under low flow conditions either on non-vertical surfaces or in filters with horizontal projected area. Other devices for removal that are based on forces imparted to the particles include centrifuges.

Magnetic filters attract and adsorb particulates owning to the magnetic susceptibility of the particulates. Enhanced filtration of non-magnetic or slightly magnetic species may be achieved by a process known as magnetic seeding. Table 3 below that summarize examples of magnetic properties of oxides, many of which are found in aqueous fluids at nuclear facilities (from Song, 2002).

TABLE 3

Magnetic properties of metals and metal oxides.

| Ferromagnetic | Ferrimagnetic | Paramagnetic | Diamagnetic |
|---|---|---|---|
| ANSI 52100 chrome steel | Magnetite ($Fe_3O_4$) | Ferrous oxide (FeO) | Copper (Cu) |
| | Cobalt ferrite ($CoFe_2O_4$) | Cobaltous oxide (CoO) | Cuprous oxide ($Cu_2O$) |
| | Magnemite ($\gamma$-$Fe_2O_3$) | Chromic oxide ($Cr_2O_3$) | Zinc oxide (ZnO) |
| | Nickel ferrite ($NiFe_2O_4$) | Nickelous oxide (NiO) | |
| | Copper ferrite ($CuFe_2O_4$) | Cupric oxide (CuO) | |
| | Hematite ($\alpha$-$Fe_2O_3$) | | |

Filter medium may be used as received or "precoated" intentionally with particulate medium as a means of enhancing filtration. Such precoat may be left in place for the life of the filter or be replaced as part of filter re-use or regeneration.

When chemical solubility limits are reached at a given pH or temperature, or chemical reactions occur prior to or within the filter medium, the deposition may be by precipitation.

Methods of Filter Regeneration or Reuse—Upon cessation or interruption of flow through a filter, retention of the particles may be physical (by entrapment), chemical (adsorption) or electrostatic attraction. FIG. 8 shows particulates with nominal diameter d3 being entrapped in the filter medium during flow, wherein d3 is greater than pore size d2. It is often desirable to remove collected particulates to be able to reuse the filter. Release of particles to regenerate or clean the filter, such as by flushing or backwashing, is achieved by imparting form drag, shear forces or other forces on the entrapped particles sufficient enough to overcome attachment to the filter surface or medium—or inter-particle attraction in materials collected at the surface of the filter (see FIG. 2). Regeneration such as through backwashing also disrupts and dislodges layers of particulates that have formed on the filter medium (a filter cake). Backwashing can be achieved by reversing flow direction at high or low flow rates (with consequent higher or lower pressure differential through the medium), by other mechanical means (pressure pulses, ultrasonic cleaning, vibration, acoustic cleaning), or a combination of methods. Whether within, at the surface of, or adjacent to the filter medium in a filter cake, the regeneration must impart a force on the particulates large enough to overcome adsorption or electrostatic attractions. The dislodged particulate material is often directed to another vessel, reservoir or filter for use or disposal. An example of ultrasonic backwashing of a filter for a nuclear application is disclosed in Gross '879. An industrial application can be seen in Advanced Filter Systems (2016). As illustrated in FIG. 9, particles can be dislodged and removed by backwashing 100 with reverse flow direction with or without optional introduction of energy 200 (back pulses, pressure pulses or ultrasonic energy).

Chemicals such as cleaning agents, film forming agents (e.g., chemical substances that are in the oligo-alkyl-amino fatty amine family as described in Betova (2014)), film forming products or substances (e.g., ethylenebis stearamide (EBS) as described in Stuart (2019)), surfactants, or pH adjusting agents can be uses to augment backwashing by changing the surface charge or adherence of the filter medium or particulates. However, adding any chemicals to aqueous fluids at nuclear facilities is challenging owing to the potential effects on system integrity (corrosion), reactivity control (in the case of dilution effects of adding any chemical to a PWR fuel pool, for example), or strict operating license limits, technical specifications or waste classification (e.g., hazardous or non-hazardous) which are based on the fluid chemistry. Limits may be due to local, State or Federal laws, or operating licenses and permits, including waste disposal or storage permits. On the other hand, limiting the use of chemical additives such as surfactants, film forming products or film forming agents only to that required for the preconditioning of fluids to be filtered or preconditioning the filter medium or apparatus itself lessens these challenges.

An improved filtration process and apparatus is provided which involves modifying the surface of filter medium or media either at its external surface, within pores, or both. These modifications may be achieved by coating, converting or treating the filtration medium or media surfaces to produce one or more layers on the wetted surfaces of the filtration medium material which change the isoelectric potential (IEP), point of zero charge (PZC) and/or zeta potential of the surface. The coating may also change the magnetic properties of the filter media at the surface.

Medium that may be coated includes but is not limited to fibers (metal or organic), porous media (metal, organic or ceramic), or particulates used as "deep bed" filters (particles, sand, and granules). In the case of natural materials, porous metals, polymers or ceramics, the applicable absolute or nominal rating of the medium range from about 0.1 to about 100 microns but can be up to 1000 microns for traditional filtration, and less than 0.01 to about 0.1 micron for ultrafiltration, and less than 0.01 micron for nanofiltration. Bed type filters amenable to treatment by the methods described herein include sand filters typically used for removal of particulates in the range of 100 to 1000 microns.

Reducing the electrostatic attraction/adhesion of the particulate(s) to the filtration medium by reducing the IEP, zeta potential, or PZC disparity between the filtration medium and the particles reduces the potential for irreversible fouling of the filter including chemical reactions within the medium during filtration. The potential of the coated filter medium being closer to that of the particulate enhances the process of backwashing the filter by reducing the electrostatic attraction that must be overcome during backwashing. The modified potential of all or part of the filter may also be used as a means of reducing "fouling" or irreversible loss of filter performance due to accumulation of particulates.

Figure 5:
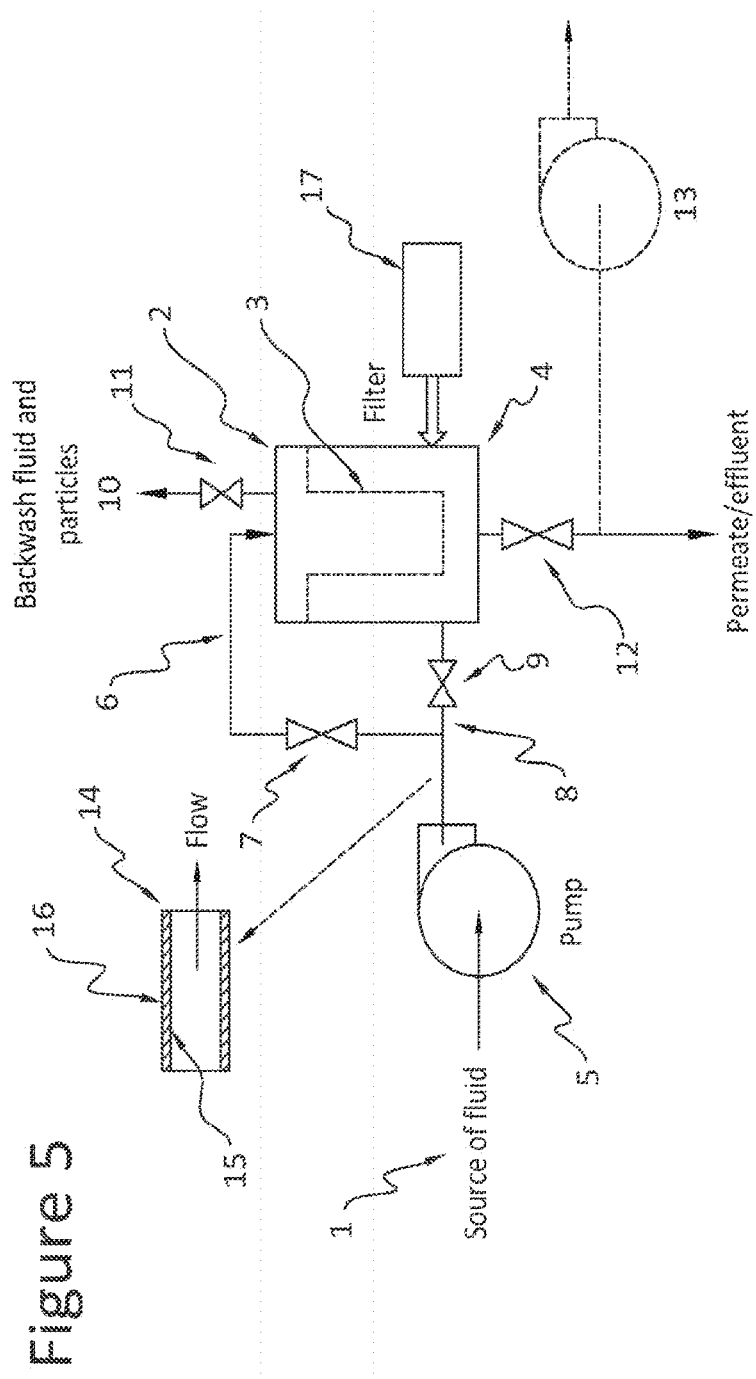
FIG. 5 shows an apparatus for improved filtration.

The apparatus according to one embodiment illustrated in FIG. 5, for example, includes (1) a filter sized to accommodate a desired rate of flow to achieve separation of a targeted quantity of particulates or soluble species from a volume of fluid in a desired time, and (2) optionally a device or devices for causing flow to occur through or over the filtration medium by imparting a differential pressure across the filter that does not exceed a limit that would compromise the structural integrity or performance of the filter or medium. The filter medium pore size or pore size distribution is selected to capture the particulates of interest by mechanical interception or adhesion. The filter medium or media is also selected to be tolerant of the fluid chemistry and other environmental parameters (temperature, pressure, or radiation field). Chemical compatibility would include corrosion resistance. In this apparatus, the specific filter medium has been coated, modified or otherwise treated to change the electrostatic attraction between the particulates and the medium—wherein the desired pore size, tortuosity and pore size distribution of the medium is that which matches the objectives for filtration after treatment of the medium. In this regard, the substrate filtration medium may have a pore size, pore size distribution, specific surface area (SSA), or tortuosity different from the final treated filtration medium (e.g., larger pores initially for a coated medium, smaller pore initially for a medium to be etched). The modification or coating of the media should not negatively impact the ability to regenerate the filter such as by backwashing, and may in fact improve backwashing process, for example rendering the surface harder, and as such, less susceptible to damage by erosion or corrosion that might be caused by high flow or cavitation damage during ultrasonic backwashing.

In particular, the apparatus, referring to FIG. 5, comprises a source of fluid 1, a filter housing 2, a filter medium or media 3, together forming a filter 4. A device 5 may optionally be provided that pumps or causes the fluid to flow through the filter. A fluid conduit 6, such as a pipe, may be provided to connect the fluid flowing or pumping device 5 to the filter 4. The fluid conduit 6 may be fitted with an optional isolation or flow limiting device such a valve 7. Additionally, a path 8, such as a pipe, is provided for fluid through the filter in reverse direction, with an isolation or flow control device such as a valve 9, to be used for backwashing alignment.

During normal filtration operation, filtered fluid exits the filter as permeate/effluent as shown optionally through a conduit and an isolation or flow limiting device 12. During backwashing with reverse flow, fluid exits via optional conduit 10 equipped optionally with a valve 11 which is closed during normal filtration operations. To assist in backwashing, a pumping or fluid flowing device for backwashing of the fluid which optionally comprises a device for introducing energy to the filter apparatus 17, may be used such as pressure pulsing, back pulsing or ultrasonic energy. The suction pump 13 may be used with or without pumping device 5 to promote flow through the filter 4. Pump 13 may also be used in lieu of pump 5 for normal filter operation by pulling liquid through the filter. In various components or parts used to construct the apparatus, such an example pipe 14 as shown, there will be both wetted surfaces 15 that are exposed to the fluid and particulates and unwetted surfaces 16 that not exposed to the fluid or particulates. Components with wetted and non-wetted surfaces include conduits (for example 6, 8), flowing or pumping devices (5, 13) valves (7, 11, 12), and the filter housing 2. Although not shown in FIG. 5, more than one filter 4 may be configured in series or parallel in the apparatus to increase throughput or filtration. In a series configuration, stages of filter 4 may include medium with different pore size or pretreatments to progressively filter the fluid depending upon the nature of the particulates in the fluid 1 and the particulates that are not captured or retained in the first stage or stages of filtration and exit with the permeate/effluent as shown in FIG. 5.

According to one embodiment, coating or treating processes may be accomplished by one of chemical reaction, oxidation, passivation, electropolishing, etching, descaling, pickling, physical vapor deposition (such as PVD or similar processes), chemical vapor deposition (CVD) or other processes. Coating may be accomplished by line of sight processes (such as sputtering or PVD), or homogenous (such as chemical treatment, CVD, electroplating or electroless deposition). Coating materials include organics and inorganics. Coatings may be magnetic or non-magnetic. Inorganic coatings include carbides, amorphous silica, silicate such as ZrC or SiC, nitrides, carbides, metals, carbon compounds such as diamond-like-coatings (DLC), ferrites, or other compounds. Nitrides, such as titanium nitride and related compounds, may also improve the hardness and hence erosion and/or corrosion resistance of the media. Organics include film forming amines and fluorinated hydrocarbons.

Coating may also be achieved by pretreatment with surfactants, film forming agents or film forming products by soaking or submerging the medium in an aqueous or non-aqueous organic solution or emulsion of the surfactant, agent or product prior to its use for filtration, or otherwise passing a surfactant, agent or product through the filter medium whereupon it is absorbed on the surface of the medium. The solution or emulsion may contain 0.1 to 50,000 ppm (mg/kg) of the agent, but preferably 1 to 1000 ppm and most preferably 10 to 100 ppm.

Figure 4:
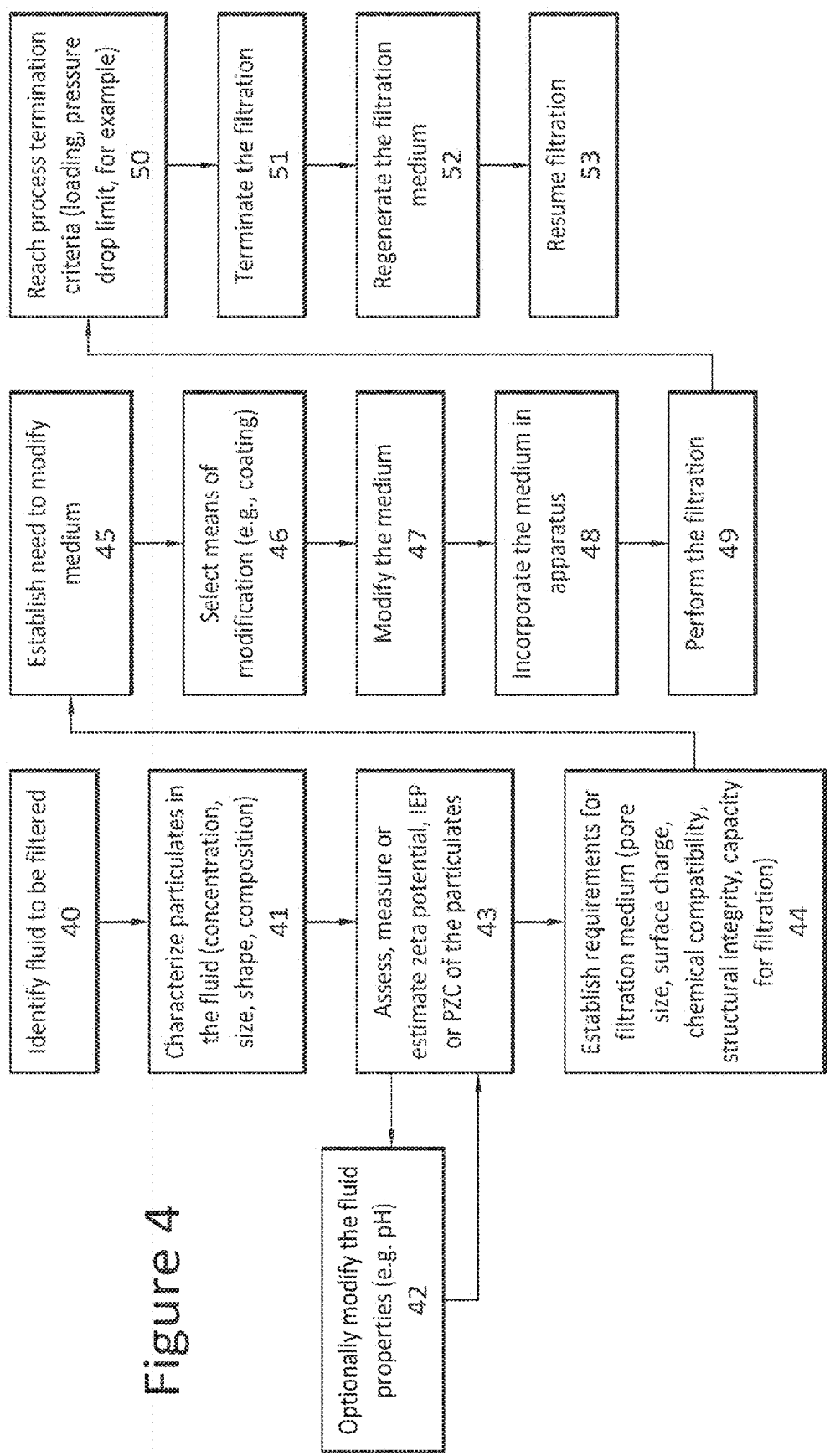
FIG. 4 shows the steps to be taken in achieving an improved filtration process.

The method according to one embodiment is summarized on the flow chart of FIG. 4. The method includes the following activities, although not necessarily in this order: identify a fluid comprising particulates to be filtered (40), estimating or measuring the IEP, PZC, or zeta potential of the particulates in fluids at nuclear facilities and the filter media as a function of pH and temperature (43), optionally modify the fluid properties such as pH or temperature (42), assessing the difference between the filtration medium and particulate(s) with regard to these parameters, taking into account the particle size and porosity of the filter (41, 44), optionally calculating the repulsive or attractive forces between the particulates and filter media to quantify the benefits of surface treatment (for example, by the well-established Derjaguin, Landau, Verwey and Overbeek (DLVO) theory) (45), selecting a surface treatment or coating that will result in reduced electrostatic attraction between the medium and the particulates within the medium or at its surface (at the cake) (46), selecting the coating, modification or surface modification process so as to meet requirements for chemical compatibility (e.g., corrosion resistance) or environmental compatibility (such as temperature rating, or radiation resistance) (46), selecting a filtration medium with an initial porosity or pore size distribution which, after coating or treatment, will result in a filtration medium with pore size or pore size distribution required for separation of the particles(s) from the fluid (46), coating, modifying or treating the filtration medium (47), using the medium for filtration (48, 49) until process termination criteria such as loading or pressure drop limit have been reached (50) at which point the filtration is terminated (51), and regenerating the filter media (52). After filter regeneration, the filtration can be resumed (53). FIG. 7 shows a representation of a filter medium 3B after homogeneous surface treatment wherein the pore size d2 is smaller after treatment (for example by coating). Alternatively, the pore size could be enlarged by surface treatment, for example, by etching.

The IEP/PZC/zeta potential can be estimated from literature data or determined by measurement (zeta meters such as the Malvern Instruments Limited "Zetasizer", acid-base potentiotitrametric techniques, etc.). In the case of soluble species, BET, Temkin, Langmuir or other adsorption isotherm models or data may be used to select the desirable coating material(s). In the case of magnetic particulates, literature data can be used, or magnetic properties measured. Other parameters used for selecting the coating may include miscibility, capillary action, wetting angle or hydrophilic/hydrophobic properties of the coating.

One skilled in the art would also appreciate that reducing the van der Waals attractive forces between the particulates and the medium may also be a criterion for selecting the medium or modification to the medium (see, for example, Chapter 4 of Rahaman, 2003) based on measured or cited Hamaker constants.

For homogeneous coating process such as CVD, the coating thickness may range from about ≤100 angstrom to 3000 angstrom or more, but preferably about 500 angstroms. For PVD coatings, the thickness may be from less than about 1 micron to more than about 5 microns, but preferably about 2 to 3 microns. For other processes such as electroless metals deposition, the coating may be less than 1 micron. For oxidation processes that modify the surface, the thickness of the modified layer can be from about <0.03 to about >3 microns.

For medium treated with film forming amines or film forming products, the thickness of the absorbed layer is on the order of 10's of angstroms for a monolayer, and specifically 12-22 nm in the case of one exemplary film forming amine octadecylamine (ODA) (see for example Baux (2018)).

One skilled in the art would understand that coating, modifying or altering the surface properties of the filtration medium could also be extended to other parts of the filtration system such as filter housings, fluid conduits and pumps to prevent adhesion of particulates and as such reduce contamination of such parts if the particulates are radioactive.

One skilled in the art would also recognize that more than one type of surface modification could be employed in combination. By way of a non-limiting example, one could coat pore surfaces internal to the medium with a homogenous process with one material and one process (e.g., ZrC by CVD), and use a second coating material on exposed surfaces using a line of site process (e.g., NiO by PVD). For nuclear site fluids, the former may be suitable for reducing adhesion of colloidal silica that may promote fouling of pores and are difficult to remove during regeneration, the later facilitating enhanced regeneration of metallic oxides with larger particles (such as CRUD) that have accumulated at the surface in a filter cake. FIG. 10 shows one embodiment of a homogeneous treatment covering internal pore structures and a second treatment only on the outer surface of the filter medium 3C. The outer surface treatment may be applied with or without the internal surface treatment.

One skilled in the art would also recognize that surface modification may include combinations of two processes such as a CVD coating followed by pretreatment with a film forming product.

Having now fully described this invention, it will be appreciated by those skilled in the art that the same can be performed within a wide range of equivalent parameters, concentrations, and conditions without departing from the spirit and scope of the invention and without undue experimentation.

While this invention has been described in connection with specific embodiments thereof, it will be understood that it is capable of further modifications. In addition, the embodiments described may be combined with one another, or made or used separately. This application is intended to cover any variations, uses, or adaptations of the inventions following, in general, the principles of the invention and including such departures from the present disclosure as come within known or customary practice within the art to which the invention pertains and as may be applied to the essential features hereinbefore set forth as follows in the scope of the appended claims.

All references cited herein, including journal articles or abstracts, published or corresponding U.S. or foreign patent applications, issued U.S. or foreign patents, or any other references, are entirely incorporated by reference herein, including all data, tables, figures, and text presented in the cited references. Additionally, the entire contents of the references cited within the references cited herein are also entirely incorporated by references.

Reference to known method steps, conventional methods steps, known methods or conventional methods is not in any way an admission that any aspect, description or embodiment of the present invention is disclosed, taught or suggested in the relevant art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

REFERENCES

The following references, which were discussed in the above description, are all incorporated by reference herein as if bodily incorporated in the application.

Advanced Filter Systems (2016) obtained from the internet at www.advanced-filter-solutions.com/files/downloads/afs_presentation_2016_en.pdf, pp 1-17.

Baux, J, et al., "Impedance analysis of film-forming amines for the corrosion protection of a carbon steel", Electrochimica Acta, 283. 699-707. (2018)

Berry, W. E and R. B. Dingle, "Survey of Corrosion Product Generation, Transport, and Deposition in Light Water Nuclear Reactors", EPRI NP-522, (March 1979).

Betova, I., M. Bojinov and T. Saario, "Film-Forming Amines in Steam Water Cycles—structure, properties, and influence on corrosion and deposition processes", VTT Research Report No VTT-R-03234-14 dated Jul. 7, 2014 (Public).

Kim, J. and D. F. Lawler, "Characteristics of Zeta Potential Distribution in Silica Particles", Bull. Korean Chem. Soc. (2005) Vol 26, No. 7, pp 1083-1089.

Kosmulski, M., "pH dependent surface charging and points of zero charge. IV. Update and new approach", Journal of Colloid and Interface Science (2009) Vol. 337, pp 439-448.

Lambert, R. and A Machiels, "Feasibility Assessment: Centrifugal Clarification for Control of Crystalline Silica in Spent Fuel Pools", EPRI TR-1009697 (Nov. 22, 2004) pp 1-66.

Malvern Instruments Technical Note MAK654-01 "Zeta Potential—An Introduction in 30 Minutes" (March 2005), pp 1-6.

PALL Food and Beverage-food-beverage.pall.com/content/dam/pall/food-beverage/literature-library/non-gated/FBTAPARTCLEN.pdf (March 2016) pp 1-8.

Rahaman, M. N., "Ceramics Processing and Sintering", Marcel Dekker Inc., New York (2003).

Song, M. C, et. al., "The Experimental Result of Magnetic Filter using Permanent Magnet for Removal of Radioactive Corrosion Product" (2002) Korea Advanced Institute of Science and Technology (KAIST). Daejeon, Republic of Korea, pp 1-7.

Stuart, D. and B. Buecker, "PE Exclusive: Emergence of Film Forming Substances for Steam Generator Corrosion Protection", Power Engineering Magazine, dated Mar. 1, 2019.

"Surface Charge", Wikipedia (2019) obtained from the internet at en.wikipedia.org/wiki/Surface charge.

Tombacz, E., "pH-dependent surface charging of metal oxides", Chemical Engineering, (2009) Vol. 52, No. 2, pp 77-86.

Ullmann's Encyclopedia of Industrial Chemistry, Gösele, W. and Alt, C. "Filtration, 1. Fundamentals" (2000), Wiley-VCH Verlag GmbH & Co, doi.org/10.1002/14356007.b02_10.

U.S. Pat. No. 8,052,879 dated Nov. 8, 2011 (Gross, '879).

U.S. Pat. No. 6,396,892 dated May 28, 2002 (Frattini '892).

Varrin, R., Jr. "Characterization of PWR Steam Generator Deposits" EPRI TR-106048, (February 1996).

The invention claimed is:

1. A method comprising:
identifying a volume of liquid or a liquid process stream containing one or more suspended radioactive particulate species,
characterizing the sizes and/or size distributions and chemical compositions of the radioactive particulate species in the volume of liquid or liquid process stream,
selecting a filtration medium that exhibits a pore size smaller than the size of a portion of or all of the radioactive particulate species so that radioactive particulate species can be captured by the filtration medium by mechanical interception during flow through the filtration medium, wherein the filtration medium is selected so as to be resistant to corrosion or degradation in the liquid comprising the volume of liquid or the liquid stream with respect to liquid chemistry and/or environmental parameters to which the filtration medium is exposed including temperature, pressure, and radiation field,
selecting one or more processes for modifying the filtration medium to improve the efficacy or efficiency of regeneration of the filtration medium,
implementing the selected one or more processes for modifying the filtration medium,
filtering the liquid containing the radioactive particulate species to remove all or a portion of the radioactive particulate species from the liquid using the modified filtration medium so as to reduce the radioactivity of the volume of liquid or liquid stream, and
regenerating the filtration medium by removing the radioactive particulate species from the filtration medium through backwashing to facilitate re-use of the filtration medium and segregation of all or a portion of the radioactive particulate species to facilitate disposal or treatment of the radioactive particulate species,
wherein the process for modifying the filtration medium to improve regeneration is a coating or surface treatment that decreases the miscibility between the coating or surface treatment and the fluid or changes the wetting angle or hydrophilic/hydrophobic interaction between the fluid or fluid stream and the surface of the filtration medium, and
wherein when the coatings are nitrides, selected from titanium nitride and other metal nitrides, the hardness and hence erosion and/or corrosion resistance of the filtration media is improved.

2. The method according to claim 1, wherein the filtration medium to be modified is selected from metal or organic fibers; metal, organic or ceramic porous media; or deep bed filter medium comprising particles or granules.

3. The method according to claim 1, wherein the process for regenerating the filter medium is backwashing of the filter by reverse flow, forward flow, pressure pulsing, acoustic pulsing, or ultrasonic cleaning.

4. The method of claim 1, wherein the process for modifying the filtration medium to improve regeneration reduces the adhesion of the radioactive particulate species to the filtration medium by reducing the difference between the surface charge of the particles and the surface charge of the filtration medium in the liquid or liquid process stream based isoelectric points (IEPs), points of zero charge (PZCs), or zeta potentials of each based on measurements made with laboratory apparatus or predictions/calculations based on published data given the chemical composition of the radioactive particulate species and filtration medium and knowledge of the pH and temperature of the volume of liquid or liquid stream.

5. The method of claim 1, wherein the process for modifying the filtration medium to improve regeneration improves the erosion resistance of the filtration medium so as to render it less susceptible to cavitation erosion and damage during backwashing by ultrasonic energy facilitating the use of higher power and or longer duration of ultrasonic backwashing thereby improving the effectiveness of the backwashing process.

6. The method according to claim 1, wherein the modification of the filtration medium is selected from a process of coating, converting, or treating using chemical reaction, oxidation, passivation, electropolishing, etching, electroplating, electroless deposition, descaling, pickling, physical vapor deposition (PVD), or chemical vapor deposition (CVD).

7. The method according to claim 4, wherein when the coating process is CVD, the coating thickness is in the range of from about ≤100 angstrom to 3000 angstrom or more.

8. The method according to claim 4, wherein when the coating process is PVD, the coating thickness is in the range of from 1 micron to 5 micron or more.

9. The method according to claim 4, wherein when the coating process is electroless metals deposition, the coating is less than 1 micron.

10. The method according to claim 4, wherein when the coating is an oxidation process that modifies the surface, the thickness of the modified layer is than about 0.03 to about 3 microns.

11. A method comprising:
identifying a volume of liquid or a liquid process stream containing one or more suspended radioactive particulate species,
characterizing the sizes and/or size distributions and chemical compositions of the radioactive particulate species in the volume of liquid or liquid process stream,
selecting a filtration medium that exhibits a pore size smaller than the size of a portion of or all of the radioactive particulate species so that radioactive particulate species can be captured by the filtration medium by mechanical interception during flow through the filtration medium, wherein the filtration medium is selected so as to be resistant to corrosion or degradation in the liquid comprising the volume of liquid or the liquid stream with respect to liquid chemistry and/or environmental parameters to which the filtration medium is exposed including temperature, pressure, and radiation field, selecting one or more processes for modifying the filtration medium to improve the efficacy or efficiency of regeneration of the filtration medium, implementing the selected one or more processes for modifying the filtration medium, filtering the liquid containing the radioactive particulate species to remove all or a portion of the radioactive particulate species from the liquid using the modified filtration medium so as to reduce the radioactivity of the volume of liquid or liquid stream, and regenerating the filtration medium by removing the radioactive particulate species from the filtration medium through backwashing to facilitate re-use of the filtration medium and segregation of all or a portion of the radioactive particulate species to facilitate disposal or treatment of the radioactive particulate species, wherein the process for modifying the filtration medium to improve regeneration improves the erosion resistance of the filtration medium so as to render it less susceptible to cavitation erosion and damage during backwashing by ultrasonic energy facilitating the use of higher power and or longer duration of ultrasonic backwashing thereby improving the effectiveness of the backwashing process, and wherein the coatings are organics selected from film forming amines, film forming agents, and fluorinated hydrocarbons, wherein the treatment of the filtration medium is performed by exposing the surface of the medium with solutions containing the organics before using the filtration medium for filtration of a volume of liquid or liquid stream, and wherein the thickness of the film forming amine or film forming product is at least one molecular monolayer and between 10 angstroms and 20 nm.

12. The method according to claim 4, wherein when the coating process is CVD, the coating thickness is about 500 angstroms.

13. The method according to claim 4, wherein when the coating process is PVD, the coating thickness is in the range of from about 2 to 3 microns.

* * * * *